July 29, 1930. F. H. GOODRICH 1,771,535
BUMPER
Filed May 3, 1929 3 Sheets-Sheet 3
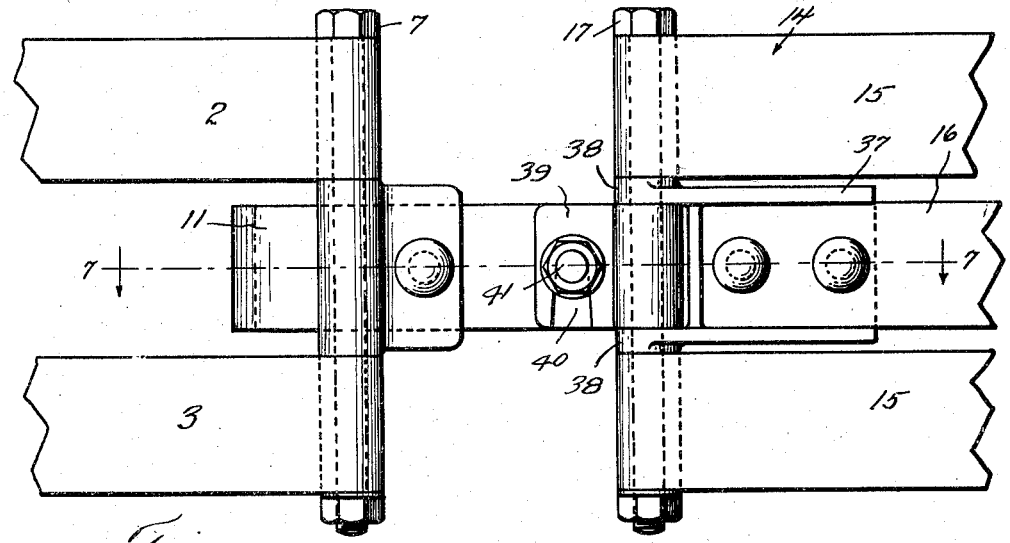
Fig. 6
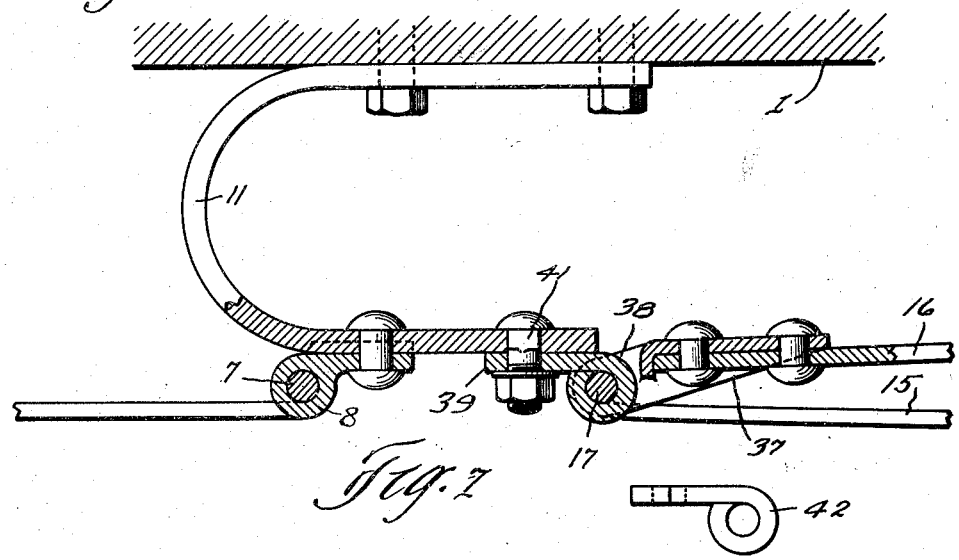
Fig. 7
Fig. 8 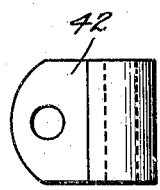 Fig. 9
Inventor
Francis H. Goodrich
By Hull, Brock & West
Attorney Patented July 29, 1930

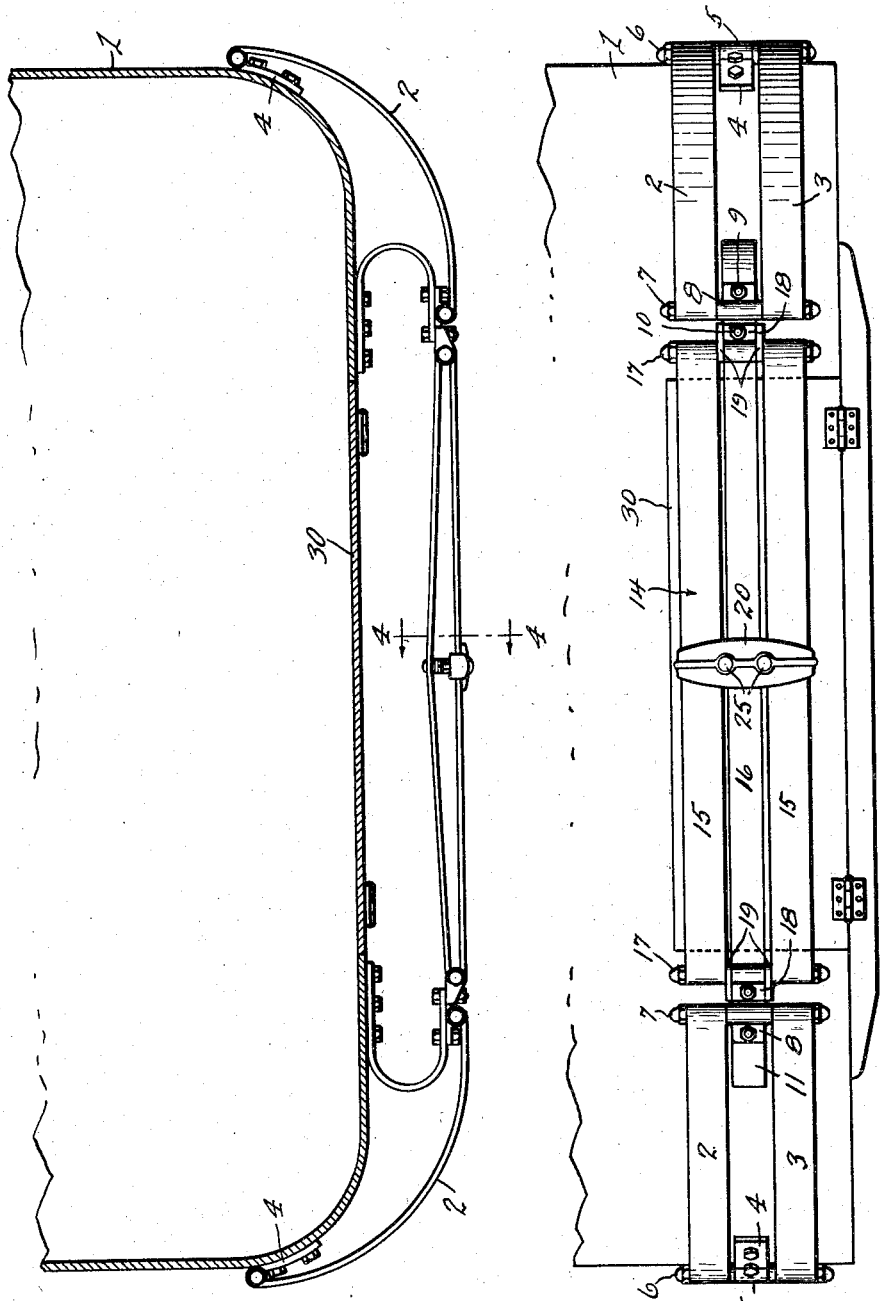

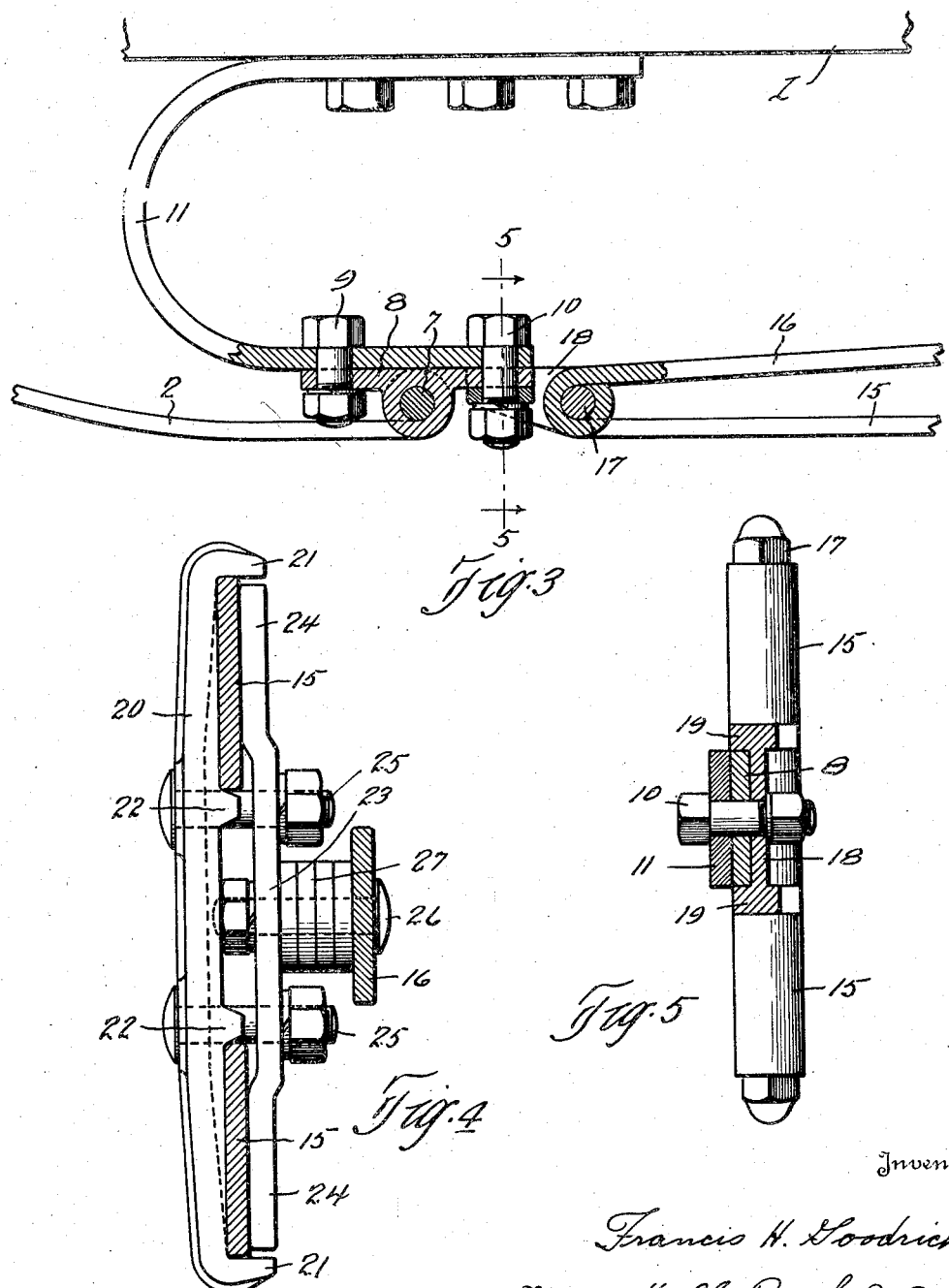

1,771,535

UNITED STATES PATENT OFFICE

FRANCIS H. GOODRICH, OF CHICAGO, ILLINOIS, ASSIGNOR TO GENERAL SPRING BUMPER CORPORATION, OF DETROIT, MICHIGAN, A CORPORATION OF MICHIGAN

BUMPER

Application filed May 3, 1929. Serial No. 360,132.

This invention relates to vehicle bumpers and more particularly to a bumper having a removable section adapted to protect the central portion of the vehicle.

An object of this invention is to provide a bumper which has a central impact section of increased strength. A further object of the invention is to provide a bumper which will give adequate protection to the corners of the vehicle and which will have a central impact section that may be conveniently removed or swung about to give access to a compartment for a spare tire or other accessories located behind such section.

On the accompanying drawings, Fig. 1 represents a plan view of my bumper, shown attached to a vehicle body, which is represented in section; Fig. 2 represents a front elevation of the bumper shown in Fig. 1; Fig. 3 is an enlarged fragmentary detail of a section of the bumper showing the pivotal connection in section; Fig. 4 is an enlarged sectional view taken on line 4—4 of Fig. 1; Fig. 5 is a sectional view taken on line 5—5 of Fig. 3; Fig. 6 is an enlarged fragmentary detail elevation of a modified from of attaching means for the center section of the bumper; Fig. 7 is a longitudinal section on line 7—7 of Fig. 6; and Figs. 8 and 9 are elevation and plane views respectively of the hinge eye member on which the center section swings.

In the following description the impact bars will be considered as the front or outer portion of the bumper and the terms "front" and "rear" and "outer" and "inner" will be used in view of such assumption.

Of the numerals shown upon the drawings, 1 denotes a portion of the vehicle to which my bumper is attached. The corners of the vehicle are protected by corner guards made up of curved bars 2 and 3 each of which is pivotally suported at its forward or inner end from a bracket 4. Each bracket 4 is bolted or otherwise secured to the body 1 and is provided with an eye portion 5 through which extends a bolt 6 which in turn passes through similar eyes at the ends of the bars 2 and 3. The outer ends of the bars 2 and 3 are secured in a similar manner by a bolt 7 to an attaching member 8 which is secured by bolts 9 and 10 to the outer leg of a horizontally disposed U-shaped resilient supporting and cushioning bracket 11, the inner leg of which is in turn bolted or otherwise secured to the vehicle body 1.

The central section of the bumper designated generally by the reference numeral 14 is composed of two vertically spaced bars 15 and a rear brace or truss bar 16. The bars are each provided with aligned eyes at their ends and are secured together by bolts 17 extending therethrough and through a clip or attaching member 18 provided with apertured flanges 19 between which the eye portion of the rear bar 16 is secured, the bolt 17 passing through the apertures in said flanges. At their outer ends the attaching members 18 are provided with apertures through which the bolts 10 pass to secure the same securely to the U-bracket 11, the flanges of the attaching member engaging the edges of the member 8 to provide a rigid joint.

Securing the bars 15 together at their center is a clamp plate 20 having rearwardly projecting end portions 21 and intermediate projections or ribs 22 between which the bars 15 are clamped, the projections 21 bearing against the outer edges of the bars while the intermediate projections 22 engage the inner edges of the bars to properly space and hold the same in such spaced relation. A second clamp plate 23 having end portions 24 engaging the rear faces of the bars is arranged in opposed relation to the front plate 20 and the plates 20 and 24 are clamped tightly together by bolts 25 with the bars 15 therebetween, the bolts being so spaced that each bears on the inner edge of the adjacent bar 15. The rear plate 23 is centrally apertured to receive the bolt 26 by which the rear or truss bar 16 is clamped thereto. Spacers 27 interposed between the rear bar 16 and the clamp plate 23 and through which the bolts 26 passes constitute the strut of the truss arrangement.

When it is desired to open the door 30 in the vehicle body across which the center section of the bumper extends it is only necessary to remove the nut from one of the bolts 10 and the center section 14 may then be swung outward, pivoting on the bolt 17 which passes through the clip or fastening member 18 at the opposite end.

In the modified form shown in Figs. 6 to 9 inclusive, the end bars 2 and 3 are secured to the U-shaped bracket 11 by an attaching clip 8 having an eye portion through which the bolt 7 passes, the clip being riveted to the bracket 11. The bars 15 and 16 are secured together at their ends by a connecting member 37 which is riveted to the bar 16 and is provided with spaced apertured ears 38 which receive the bolt 17 which passes through the eyes in the ends of the bars 15. Pivotally received on the bolt 17 between the ears 38 is a fastening member 39 provided with a notch 40 which engages over the bolt 41 in the bracket 11 so that the center portion 14 may be readily unlatched and swung outwardly, affording access to the compartment closed by the door 30. At the opposite end the center portion 14 of the bumper provided with a clip 37 the same as shown in Fig. 6, is secured to the opposite bracket 11 by a clip 42 as shown in plan and elevation in Figs. 8 and 9 respectively, the same being pivoted on the bolt 17 in the same manner as the member 39 shown in Figs. 6 and 7.

It is only necessary to loosen the nut on the bolt to permit the center section 14 to be lifted slightly to disengage the clip 39 from the bolt and swing the same outwardly on the opposite clip 18 or 42, as the case may be, secured to opposite bracket 11.

The construction of bumper herein disclosed provides an impact section across the entire end of the vehicle in substantially the same plane and the trussed central section 14 increases the resistance of that portion of the bumper to blows directed thereupon.

Having thus described my invention, what I claim is:

1. In combination with an end portion of a vehicle having a compartment therein opening outwardly therefrom, a bumper carried by the end of said vehicle extending across the opening of said compartment comprising a resilient cushioning bracket secured to said vehicle at each side of said compartment, a central bumper section secured at its ends by pivotal connections to said brackets, said impact section comprising a pair of front vertically spaced horizontal bars and a rear bar secured together at their ends, and spacing means interposed between the center portion of the front bars and the rear bar constituting a strut, whereby the rear bar operates as a brace for the front bars, said central bumper section being adapted to swing horizontally on one end connection when the opposite end is disconnected from its bracket.

2. The combination with a vehicle, of corner guards for opposite corners of said vehicle, cushioning brackets secured to said vehicle to which the inner ends of said corner guards are secured, a center bumper section secured at one end by a pivotal connection to one of said brackets, and detachably secured at its opposite end to another of said brackets, said center bumper section comprising spaced horizontal front bars and a rear bar secured together at their ends, and a spacer member interposed between the front bars and the rear bar intermediate their ends whereby a truss arrangement is formed, imparting strength to the front or impact bars of said center section.

3. In a vehicle bumper the combination of cushioning end brackets, a central bumper section secured at one end by a pivotal connection to one of said brackets, and having means at the opposite end for securing it to the other of said brackets, said central section comprising front impact bars and a rear brace bar secured together at their ends, and a strut interposed between the front bars and the rear bar providing a truss structure.

4. In a vehicle bumper the combination of spaced corner guards each including a cushioning bracket for attachment to a vehicle, a central bumper section pivoted at one end to one of said guards and detachably secured at its opposite end to the other of said guards, said central section comprising a pair of front horizontal bars and a rear bar secured together at their ends, and a strut member interposed between the front bars and the rear bar at their center portions providing with said bars a truss structure.

5. In a vehicle bumper the combination of spaced corner guards each including a cushioning bracket for attachment to a vehicle, a central bumper section pivoted at one end to one of said guards and detachably secured at its opposite end to the other of said guards, a pair of vertically spaced horizontal front bars and a rear bar provided at their ends with portions having vertically aligned bolt receiving apertures, a bolt member at each end passing through said apertures and securing the bars together, and spacing means interposed between the central portions of the front bars and the rear bar providing with said bars a truss structure.

6. In a vehicle bumper the combination of spaced corner guards each including a cushioning bracket for attachment to a vehicle, a central bumper section pivoted at one end to one of said guards and detachably secured at its opposite end to the other of said guards, said central section comprising a pair of vertically spaced horizontal front bars and a rear bar provided at their ends with portions having vertically aligned bolt receiving apertures, a bolt member at each end passing through said apertures and securing the bars together, clamping means securing the central portion of said front bars in predetermined spaced relation, and a spacer interposed between said clamping means and rear bar providing a truss structure, whereby the rear bar forms a brace for said front bars.

7. In a vehicle bumper the combination of spaced corner guards each including a cushioning bracket for attachment to a vehicle, a central bumper section pivoted at one end to one of said guards and detachably secured at its opposite end to the other of said guards, said central section comprising a pair of vertically spaced horizontal front bars and a rear bar provided at their ends with portions having vertically aligned bolt receiving apertures, a bolt member at each end passing through said apertures and securing the bars together, opposed clamping plates securing the central portion of said front bars together in spaced relation, a spacer interposed between the rear clamp plate and the rear bar, and means securing the rear bar and spacer to said clamp plates whereby the rear bar forms a brace for said front bars.

8. In a vehicle bumper the combination of spaced corner guards each including a cushioning bracket for attachment to a vehicle, a central bumper section pivoted at one end to one of said guards, and detachably secured at its opposite end to the other of said guards, said central section comprising a pair of front horizontal bars and a rear bar secured together at their ends, clamp members securing the central portion of the front bars together, a spacing member interposed between the clamp members and the rear bar, and a bolt member securing the rear bar and spacing member to one of said clamp members whereby a truss structure is formed.

9. In a vehicle bumper having spaced corner guards each including a cushioning bracket at its inner end for attachment to a vehicle, a central bumper section pivoted at one end to one of said guards and detachably secured at its opposite end to the other of said guards, said central section including vertically spaced horizontal front impact bars, and a rear brace bar attached at its ends to the ends of said front bars, a clamp for securing the central portions of said impact bars in spaced relation comprising a front plate embracing the front side of said bars, and a rear plate having end portions bearing on the rear side of said bars, bolt means clamping the parts together, a spacer interposed between the rear plate and the rear bar and bolt means securing said rear bar and spacer to said clamp.

10. In a vehicle bumper having spaced corner guards each including a cushioning bracket at its inner end for attachment to a vehicle, a central bumper section pivoted at one end to one of said guards and detachably secured at its opposite end to the other of said guards, said central section including a pair of vertically spaced front bars and a rear brace bar provided at their ends with eye portions, an attaching member having apertured ears between which the eye portion of the rear bar is positioned, a bolt passing through the eye portions of said bars and the said attaching member for securing the parts in assembled relation and on which said central section pivots, said attaching member having an extension by which the same is secured to the corner guard.

11. In a vehicle bumper having spaced corner guards each including a cushioning bracket at its inner end for attachment to a vehicle, a central bumper section pivoted at one end to one of said guards and detachably secured at its opposite end to the other of said guards, said central section including a pair of vertically spaced front bars and a rear brace bar provided at their ends with eye portions, an attaching member having an eye portion, a bolt passing through the ends of said bars and attaching member for securing the same together and on which the central section of the bumper pivots, said attaching member being secured to one of said corner guards.

12. In a vehicle bumper having spaced corner guards each including a cushioning bracket at its inner end for attachment to a vehicle, a central bumper section pivoted at one end to one of said guards and detachably secured at its opposite end to the other of said guards, said central section including a pair of vertically spaced front bars and a rear brace bar provided at their ends with eye portions, an attaching member having an eye portion, a bolt passing through the ends of said bars and attaching member for securing the same together and on which the central section of the bumper pivots, said attaching member including a wing portion having a slot therein, a bolt in one of said corner guards over which said slotted wing portion engages, whereby the same may be quickly detached therefrom.

In testimony whereof, I hereunto affix my signature.

FRANCIS H. GOODRICH.